United States Patent Office 3,491,161
Patented Jan. 20, 1970

---

3,491,161
TREATMENT OF SPENT GLYCOL
James W. Pitts, Port Neches, Tex., assignor to Jefferson Chemical Company, Inc., Houston, Tex., a corporation of Delaware
No Drawing. Filed July 18, 1966, Ser. No. 565,728
Int. Cl. C07c 29/24
U.S. Cl. 260—637                      2 Claims

ABSTRACT OF THE DISCLOSURE

Ethylene glycol can be recovered from a spent glycol containing ester impurities by treating the spent glycol with at least a stoichiometric amount of ammonia to substantially convert the ester impurities to the corresponding amides and alcohols and distilling the reaction mixture to recover ethylene glycol.

---

This invention concerns the treatment of a spent glycol stream to facilitate recovery of the ethylene glycol content. More particularly, this invention concerns the treatment of a spent glycol stream with ammonia to convert the esters in the stream to amides and alcohols, thus facilitating recovery of the ethylene glycol.

The manufacture of a polymeric polyester by the reaction of ethylene glycol and dimethyl terephthalate generally results in a residual glycol stream contaminated with dimethyl terephthalate and other esters and impurities including, at times, water and methanol. This contaminated glycol is often referred to by the trade as "spent glycol." Spent glycol normally contains 80–98% ethylene glycol. Approximately one-half of the ethylene glycol employed in the polyesterification reaction is to be found in the spent glycol stream. Thus, the recovery of the ethylene glycol from this stream plays an important part in the economics of the polyesterification reaction.

Heretofore, spent glycol has been upgraded by the addition of about 25% water, followed by separation of the water, solids and methanol from the glycol by distillation. However, it has been found that the dimethyl terephthalate, and perhaps other esters in the glycol, azeotropes with the water during distillation and tends to plug pumps, lines, exchangers and other equipment in the overhead of the still.

I have now discovered that this fouling problem can be overcome by treatment of the spent glycol containing ester impurities with ammonia prior to the distillation. The distillation is still facilitated by the addition of water, and water is preferably added prior to distillation, either before or after the ammonia treatment.

Either anhydrous ammonia or ammonium hydroxide may be employed in the treatment of the spent glycol stream. The amount of ammonia employed should be at least the stoichiometric amount necessary to substantially completely convert all esters present to the corresponding amides and alcohols. Preferably, an excess of ammonia, such as, for example, a 20% excess is employed. An even greater excess may be employed if desired. The amount of ester present will vary from one batch of spent glycol to another. However, for any particular batch, the amount of ester present can be readily determined by analysis and the stoichiometric amount of ammonia calculated.

The ammonolysis reaction proceeds readily at any reasonable temperature. As to be expected, the required reaction time decreases with an increase in temperature so that it might be desirable to conduct the ammonolysis at an elevated temperature in order to reduce the reaction time. However, I have found it convenient to mix the ammonia with the spent glycol and let the mixture stand for from 24 to 48 hours at ambient temperature. Thus, ammonia may be added to spent glycol in storage, allowing the ammonolysis to occur prior to the distillation of the spent glycol stream.

My invention will be further illustrated by the following specific example, which is illustrative only and is not intended to limit the invention.

EXAMPLE I

Spent glycol (500 grams), containing 85% ethylene glycol, from the reaction of dimethyl terephthalate and ethylene glycol was stirred with two grams of 29.7% aqueous ammonia for 36 hours in a closed vessel at atmospheric pressure and ambient temperature (20–35° C.). The mixture was then diluted with 100 ml. of water, dewatered on a 1″ x 12″ packed column at atmospheric pressure and a reboiler temperature of 200° C., and ethylene glycol was then recovered from the dewatered crude on the same column at an overhead temperature of 96° C. and 12 mm. pressure. There was no fouling or plugging of either the still bottoms or overhead system. In another test run, following the same procedure but omitting the ammonolysis step, plugging of the overhead product line became so severe that the distillation had to be discontinued.

It is an advantage of my invention that the recovery of ethylene glycol is essentialy quantitative. The only losses that occur are due to column hold up and the normal handling losses. Further, the still bottoms from the distillation are liquid, so that it is unnecessary to add a chaser to the distillation.

Having thus described my invention, I claim:
1. A method for the recovery of ethylene glycol from a spent glycol containing ester impurities which comprises the steps of treating the spent glycol with at least a stoichiometric amount of aqueous ammonium hydroxide to substantially convert the ester impurities to the corresponding amides and alcohols by allowing the mixture of aqueous ammonium hydroxide and spent glycol to stand at ambient temperature from about 24 to about 48 hours to effect conversion of the ester impurities, adding water to said mixture and recovering the ethylene glycol by distillation.
2. The method of claim 1 wherein the water is added prior to treating the spent glycol with the aqueous ammonium hydroxide.

References Cited

UNITED STATES PATENTS

| | | | |
|---|---|---|---|
| 819,646 | 5/1906 | Glatz | 260—404 |
| 2,756,199 | 7/1956 | Smith | 260—645 |
| 2,793,235 | 5/1957 | Jenkinson | 260—637 |
| 2,903,477 | 9/1959 | Hughes et al. | |

FOREIGN PATENTS

| | | |
|---|---|---|
| 801,723 | 9/1958 | Great Britain. |
| 1,189,537 | 3/1965 | Germany. |

OTHER REFERENCES

Lascaray, "J. of the Am. Oil Chemical Society," vol. 29, 1952, pp. 362–366.

LEON ZITVER, Primary Examiner

JOSEPH E. EVANS, Assistant Examiner

U.S. Cl. X.R.

203—29; 260—558, 638